US009798445B2

(12) United States Patent
Niwano et al.

(10) Patent No.: US 9,798,445 B2
(45) Date of Patent: Oct. 24, 2017

(54) MEASURING INSTRUMENT

(71) Applicant: MITUTOYO CORPORATION, Kanagawa (JP)

(72) Inventors: Atsuya Niwano, Tokyo (JP); Kazuhiro Ishizu, Kawasaki (JP); Nobuyuki Hayashi, Kawasaki (JP); Yasuhiro Tsujimoto, Kawasaki (JP); Takashi Kozawa, Kawasaki (JP); Takefumi Kiwada, Minamikiso-machi (JP); Makoto Furuta, Nakatsugawa (JP); Aki Hiroshima, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 393 days.

(21) Appl. No.: 14/669,240

(22) Filed: Mar. 26, 2015

(65) Prior Publication Data

US 2015/0286354 A1 Oct. 8, 2015

(30) Foreign Application Priority Data

Apr. 3, 2014 (JP) ................................ 2014-077164

(51) Int. Cl.

| | |
|---|---|
| ***G06F 15/00*** | (2006.01) |
| ***G06F 3/0482*** | (2013.01) |
| ***G06F 15/02*** | (2006.01) |
| ***G06F 3/0484*** | (2013.01) |
| ***G01B 3/22*** | (2006.01) |

(52) U.S. Cl.

CPC ............ *G06F 3/0482* (2013.01); *G01B 3/22* (2013.01); *G06F 3/04847* (2013.01); *G06F 15/0275* (2013.01); *G09G 2340/145* (2013.01)

(58) Field of Classification Search

CPC ... G06F 15/0275; G06F 15/0208; G01B 3/22; G01D 7/002; G09G 2340/145

See application file for complete search history.

(56) References Cited

U.S. PATENT DOCUMENTS

| | | | | |
|---|---|---|---|---|
| 5,235,268 A * | 8/1993 | Harthcock | G01R 1/06788 324/115 |
| 5,969,718 A * | 10/1999 | Mills | G06F 3/0489 345/172 |
| 7,100,298 B2 * | 9/2006 | Kiwada | G01B 3/22 33/613 |

FOREIGN PATENT DOCUMENTS

| | | |
|---|---|---|
| JP | H09-049723 | 2/1997 |
| JP | 2000-205852 | 7/2000 |

* cited by examiner

*Primary Examiner* — Alvin Tan

(74) *Attorney, Agent, or Firm* — Greenblum & Bernstein, P.L.C.

(57) ABSTRACT

A measuring instrument includes a main body casing, a detector on the main body casing and detecting an amount of stylus head displacement, a display on an outer surface of the casing; a plurality of key switches on the outer surface, a menu proximate the display on the outer surface, and a display controller controlling the display. The display includes a main display and a cursor display, which is arranged in a location alongside the menu and displays a cursor pointing to the menu, and performs control such that a measured value based on an amount of displacement is displayed, but the cursor is not displayed when in a measurement mode where the detector detects the amount of displacement, and such that a cursor is displayed so as to point to the menu corresponding to a selected menu when in a settings mode where measurement conditions are set.

20 Claims, 9 Drawing Sheets

MEASURING INSTRUMENT

CROSS-REFERENCE TO RELATED APPLICATIONS

The present application claims priority under 35 U.S.C. §119 of Japanese Application No. 2014-077164, filed on Apr. 3, 2014, the disclosure of which is expressly incorporated by reference herein in its entirety.

BACKGROUND OF THE INVENTION

1. Field of the Invention

The present invention relates to a measuring instrument in which measured values are displayed on a display provided on an outer surface of a main body casing.

2. Description of Related Art

Dial displays in which measured values are displayed using needles and digital displays employing liquid crystal panels and the like are already known for measuring instruments that measure a height and the like of an object using an amount of stylus head displacement. For example a dual digital/analog display-type measuring instrument provided with a digital display displaying a measured value digitally based on the amount of stylus head displacement and an analog display performing analog display is disclosed in Japanese Patent Laid-open Publication No. 2000-205852.

Furthermore, a digital display displacement measuring instrument providing an LCD-based display is disclosed in Japanese Patent Laid-open Publication No. H9-49723. The LCD-based display for this measuring instrument may be switched between a value mode, which displays an amount of spindle displacement, and a tolerance enlargement mode, which displays a judgment result indicating a relationship of a displacement amount to upper and lower limit values.

In order to accommodate measurements for various objects, the measuring instrument can be switched into various measurement modes to perform measurement. Consequently, measurements can be performed accurately utilizing a user-selected measurement mode by setting various parameters such as measurement conditions corresponding to a measurement mode, display settings, and the like.

However, in this measuring instrument, the display and key switches are arranged on a main body casing that is limited in size. Furthermore, a user must rely upon operation of a limited number of key switches and information displayed on the display when conducting measurements and making settings. Particularly, many parameters must be set in a settings mode, and it is imperative for compact measuring instruments to achieve an interface with superior visibility and that is easily operated by a user.

SUMMARY OF THE INVENTION

The present invention provides a measuring instrument with superior visibility and operability.

A measuring instrument according to the present invention includes a main body casing; a detector that is provided on the main body casing and that detects an amount of stylus head displacement; a display that is provided on an outer surface of the main body casing; a plurality of key switches provided on the outer surface; a menu notation (also referred to as a menu) having a plurality of menu indicia provided in proximity to the display on the outer surface; and a display controller which controls the display of the display. The display includes a main display portion (main display region) and a cursor display portion (cursor display region), which is arranged alongside the menu notation and displays a cursor that points to the menu notation. The measuring instrument is provided with a display controller which performs control such that a measured value based on the displacement amount is displayed on the main display portion but the cursor is not displayed on the cursor display portion during a measurement mode in which the detector detects the displacement amount. Furthermore, the display controller performs control such that the cursor points to the menu notation corresponding to a selected menu when in a settings mode where measurement conditions are set.

According to this configuration, cause the cursor is not displayed on the cursor display portion during the measurement mode, a user can observe a measured value displayed on the display be. Meanwhile, because the cursor is displayed so as to point at the menu notation corresponding to the selected menu while in the settings mode, the user can easily confirm the selected menu in the settings mode.

In the measuring instrument according to the present invention, the display preferably further includes an operation guide display portion that is arranged in proximity to each of the plurality of key switches. Additionally, the display controller performs control such that, in the settings mode, a guide display corresponding to at least one assigned operation of the plurality of key switches for a selected menu is displayed on the operation guide display portion. The display controller performs control such that the guide displays are not displayed on the operation guide portion corresponding to key switches not assigned operations in a selected menu.

According to this configuration, the guide displays corresponding to the functions or operations assigned to the key switches are displayed when in the settings mode. As a result, the user can set parameters easily while referencing these guide displays. Since the guide displays are not displayed for key switches that have not been assigned functions or operations, the user can easily distinguish between usable and unusable key switches on a selected menu.

In the measuring instrument according to the present invention, a first notation (first indicium) indicates operations in which a press time of a key switch is shorter than a preset amount of time and a second notation (second indicium) indicates operations in which the press time of the key switch is equal to or longer than the preset amount of time, both notations being written in proximity to at least one of the plurality of key switches on the outer surface.

According to this configuration, operations cycled via the key switch press time can be easily selected since both notations are written in proximity to the key switches, the first notation indicating operations in which the press time of the key switch is shorter than the preset amount of time (a short press), and the second notation indicating operations in which the press time of the key switch is equal to or longer than the preset amount of time (a long press).

In the measuring instrument according to the present invention, the plurality of key switches are arranged on at least one of upper and lower sides of the display and the menu notation is arranged on at least one of left and right sides of the display. According to this configuration, visibility and operability can be improved by effectively utilizing the main body casing that is limited in size.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

Figure 1:
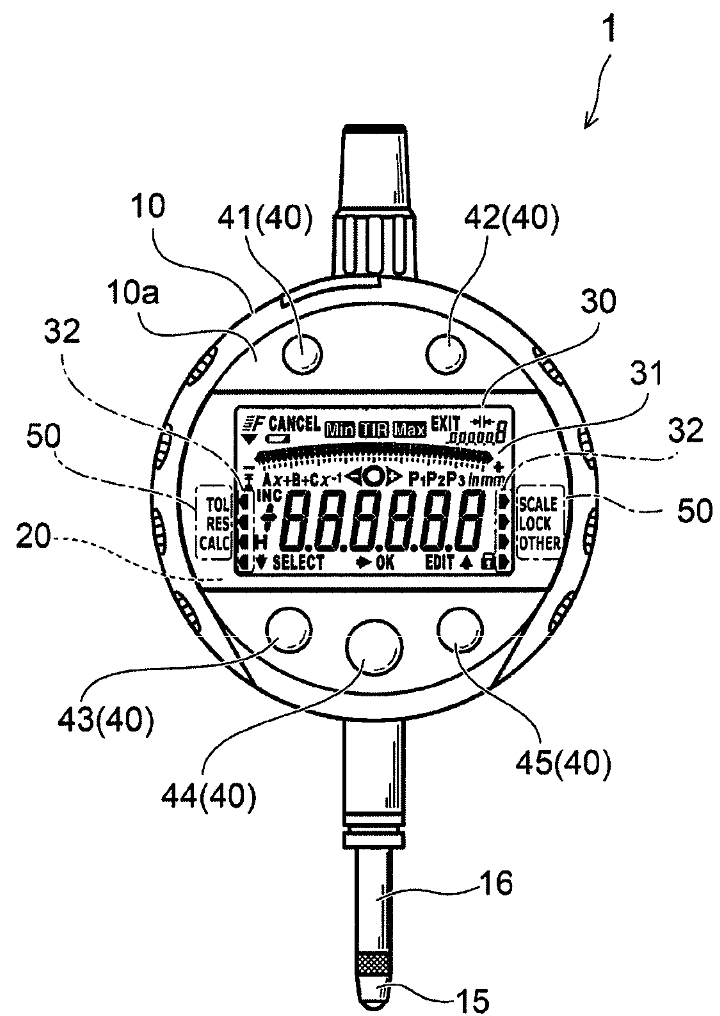
FIG. 1 illustrates a front view of a measuring instrument according to a first embodiment of the present invention.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Below is a description of a first embodiment of the present invention with reference to the drawings. Detailed descriptions are omitted as appropriate by applying identical reference numerals to identical elements and aforementioned statements in regard to previously covered diagrams for each of the figures and for the specification of the present application.

FIG. 1 illustrates a front view of an exemplary measuring instrument according to the first embodiment. As illustrated in FIG. 1, a measuring instrument 1 according to the present embodiment is an indicator in which a measured value based on an amount of stylus head 15 displacement is displayed on a display 30. The measuring instrument 1 is provided with a main body casing 10 which has a front surface 10*a* that is substantially circular. An outer surface of the main body casing 10 includes surfaces other than the front surface 10*a* such as back and side (outer peripheral surface) surfaces. In other words, the front surface 10*a* is one example of the main body casing 10 outer surface. A spindle 16 extending on the lower side of the main body casing 10 is provided so as to retract toward the main body casing 10. The stylus head 15 is attached to a tip of the spindle 16. The spindle 16 retracts in correspondence to a height of a measurement point on an object by touching the stylus head 15 to the measurement point. A measured value corresponding to an amount of spindle 16 retraction, or rather, the amount of stylus head 15 displacement, is displayed on the display 30.

A detector 20 that converts the amount of stylus head 15 displacement into an electric signal is provided in the main body casing 10. The detector 20 is provided with an encoder and a counting circuit that are not illustrated in the drawings. A measured value is calculated based on signals that are outputted by the detector 20.

The display 30 is provided at roughly a center of the front surface 10*a* of the main body casing 10. The display 30 has, for example, an LCD panel. The display 30 displays measurement-related information using a segmentation method. Additionally the display 30 may also display information using a dot matrix method. The display 30 is described in detail below.

A plurality of key switches 40 is provided on the front surface 10*a* of the main body casing 10. Five key switches 41 to 45 are arranged peripherally to the display 30 in the present embodiment. The key switches 40, for example, are round switches where a switch center protrudes outward. Locations of the key switches 40 can be found easily with fingers since the key switches 40 protrude with respect to the front surface 10*a*.

The plurality of key switches 40 is arranged on at least one of the upper and lower sides of the display 30. In the present embodiment, two key switches 41 and 42, of the five key switches 41 to 45, are respectively laid out on the left and right of the upper side of the display 30. The remaining three key switches 43 to 45 are laid out on the lower side of the display 30. One (key switch 44) of these three, key switches 43 to 45, is positioned in the center and the remaining two (key switches 43 and 45) are respectively laid out to the left and right of key switch 44.

A menu notation 50 is provided in proximity to the display 30 on the front surface 10*a* of the main body casing 10. The menu notation (or menu) 50 displays menu items (or menu indicia) to be selected when determining various settings on the measuring instrument 1. The menu notation 50 is printed on the front surface 10*a* using, for example, screen printing. The menu notation 50 is arranged on one of the left and right sides of the display 30. In the present embodiment, the menu notation 50 is arranged on both the right and left sides of the display 30. Visibility and operability can be improved by effectively utilizing the main body casing 10 that is limited in size via this menu notation 50 and key switch 40 layout.

Figure 2A:
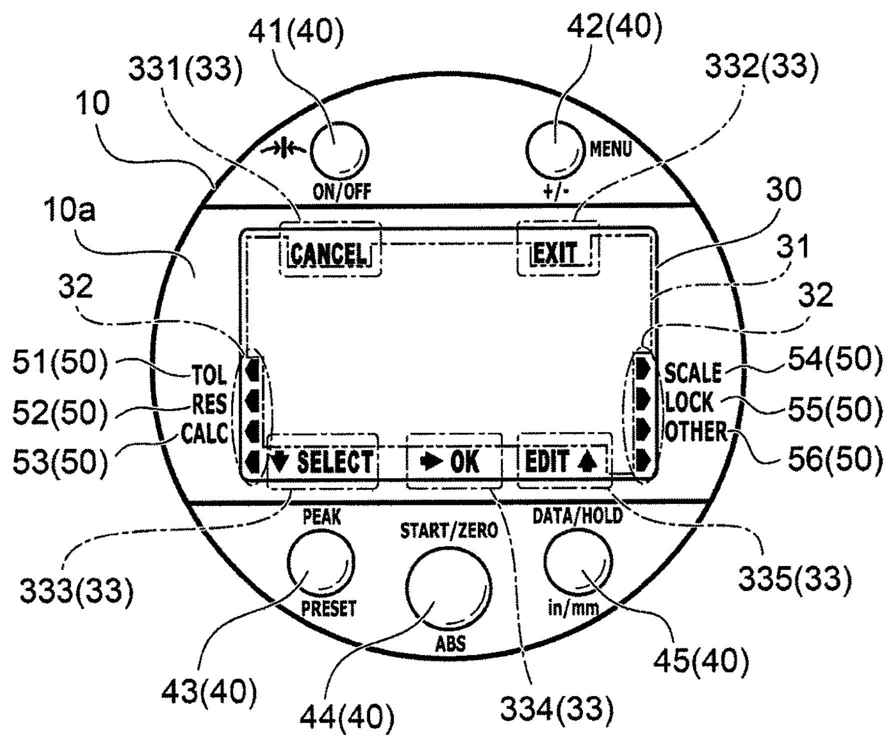
FIGS. 2A to 2C illustrate schematic diagrams of the frontal configuration of a main body casing centered on a display.
Figure 2B:
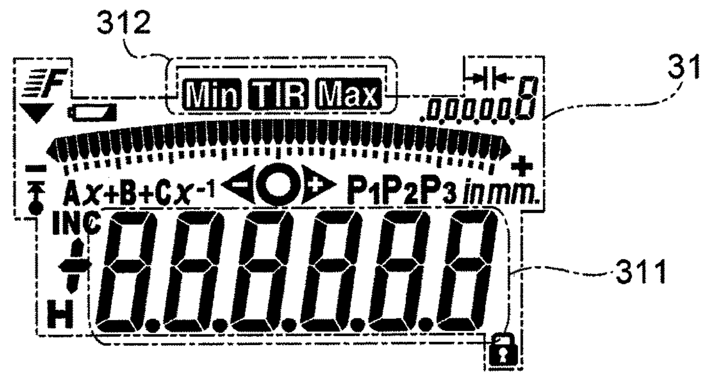
Figure 2C:
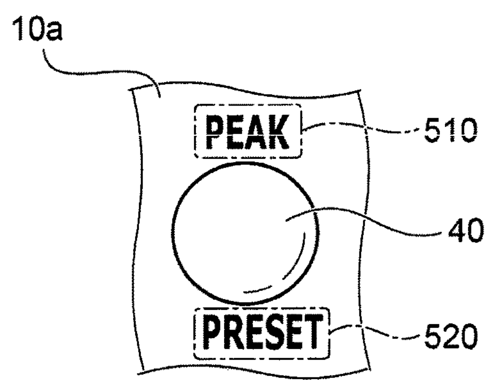

The following is a detailed description of the display 30. FIGS. 2A to 2C are schematic diagrams illustrating an exemplary front configuration of the main body casing centered on the display. FIG. 2A illustrates the front surface 10*a* layout of the main body casing 10, FIG. 2B illustrates the main display portion 31 of the display 30, and FIG. 2C illustrates a key switch 40 and notations in proximity to the key switch 40.

As illustrated in FIG. 2A, the display 30 is arranged in the center of the substantially circular front surface 10*a* of the main body casing 10. A display region of the display 30 is approximately rectangular in shape and longer on a horizontal side, for example. The display 30 includes a main display portion 31, a cursor display portion 32, and an operation guide display portion 33. The main display portion 31 is arranged on the approximate center of the display 30. The main display portion 31 displays necessary information while measuring.

As illustrated in FIG. 2B, a segment display portion 311 is provided in the widest region as the main display portion 31. The segment display portion 311 is the portion that displays a measured value using, for example, seven segments. Additionally, an analog display portion 312 is provided to the main display portion 31 as needed. Necessary information such as units, peak hold type, preset numbers, and remaining battery life is also indicated in the main display portion 31.

As illustrated in FIG. 2A, the cursor display portion 32 is provided in a position near an edge of the display region of the display 30, alongside the menu notation 50. The menu notation 50 includes a plurality of menu print (menu print items, menu indicia, or menu items) 51 to 56. For example, the menu print 51 to 53 is arranged on the left side of the display 30 and the menu print 54 to 56 is arranged on the right side of the display 30. The cursor display portion 32 which points to each menu print 51 to 56 is displayed alongside the plurality of menu print 51 to 56, respectively. A cursor is displayed so as to point to the menu print, among the plurality of menu print 51 to 56, corresponding to the menu indicium selected.

The operation guide display portion 33 is a portion close to an edge of the display region of the display 30, arranged in proximity to each of the plurality of key switches 40, respectively. The operation guide portion 33 displays guide displays 331 to 335 corresponding to an operations assigned to at least one of the plurality of key switches 40 of a selected menu.

The layout of the guide displays 331 to 335 corresponds to the layout of the plurality of key switches 40 in the display region of the display 30. For example, the guide display 331 corresponding to the key switch 41, which is arranged on the top left of the front surface 10*a*, is arranged in the top left of the display region of the display 30. Similarly, the guide display 335 corresponding to the key switch 45, which is arranged on the bottom right of the front surface 10*a*, is arranged in the bottom right of the display region of the display 30.

Additionally, for cases where a function of a key switch 40 changes according to the selected menu, guide displays corresponding to each respective function are provided. Consequently, the user can easily distinguish what function is assigned to which key switch 45.

As illustrated in FIG. 2C, a first notation 510 indicating operations in which a key switch 40 press time is shorter than a preset amount of time (a short press), and a second notation 520 indicating operations in which the key switch 40 press time is equal to or longer than the preset amount of time (a long press), are both written in proximity to the key switches 40.

The first notation 510 that indicates short press operations is printed above the key switches 40 and the second notation 520 that indicates long press operations is printed below the key switches 40. In the case that both the first notation 510 and the second notation 520 are provided for the plurality of key switches 40, the arrangement for both the first notation 510 and the second notation 520 is the same for all of the key switches 40. In this way, the user can easily distinguish the difference between short and long press operations that are assigned to the key switches 40. For example, functions that are frequently used and functions that have a low risk of operational error are assigned as short press operations. Meanwhile, functions that are not frequently used and functions that have a high risk of operational error are assigned as long press operations.

Notations that are provided in proximity to the key switches 40 are printed using, for example, screen printing. These notations correspond to valid key functions in the measurement mode. Since these key functions are printed, the visibility of the function notation assigned to each key switch 40 is improved while the user conducts measurements in the measurement mode.

Among the key switches 40, the key switches 43 to 45 that are arranged below the display 30 are larger than the key switches 41 to 42 that are arranged above the display 30. Thus, the key switches 43 to 45, which are used frequently during the measurement mode, are easier to press. Increased operability and visibility can be ensured by the notations for key functions that are frequently used in the measurement mode being assigned to correspond to the key switches 43 to 45.

Figure 3:
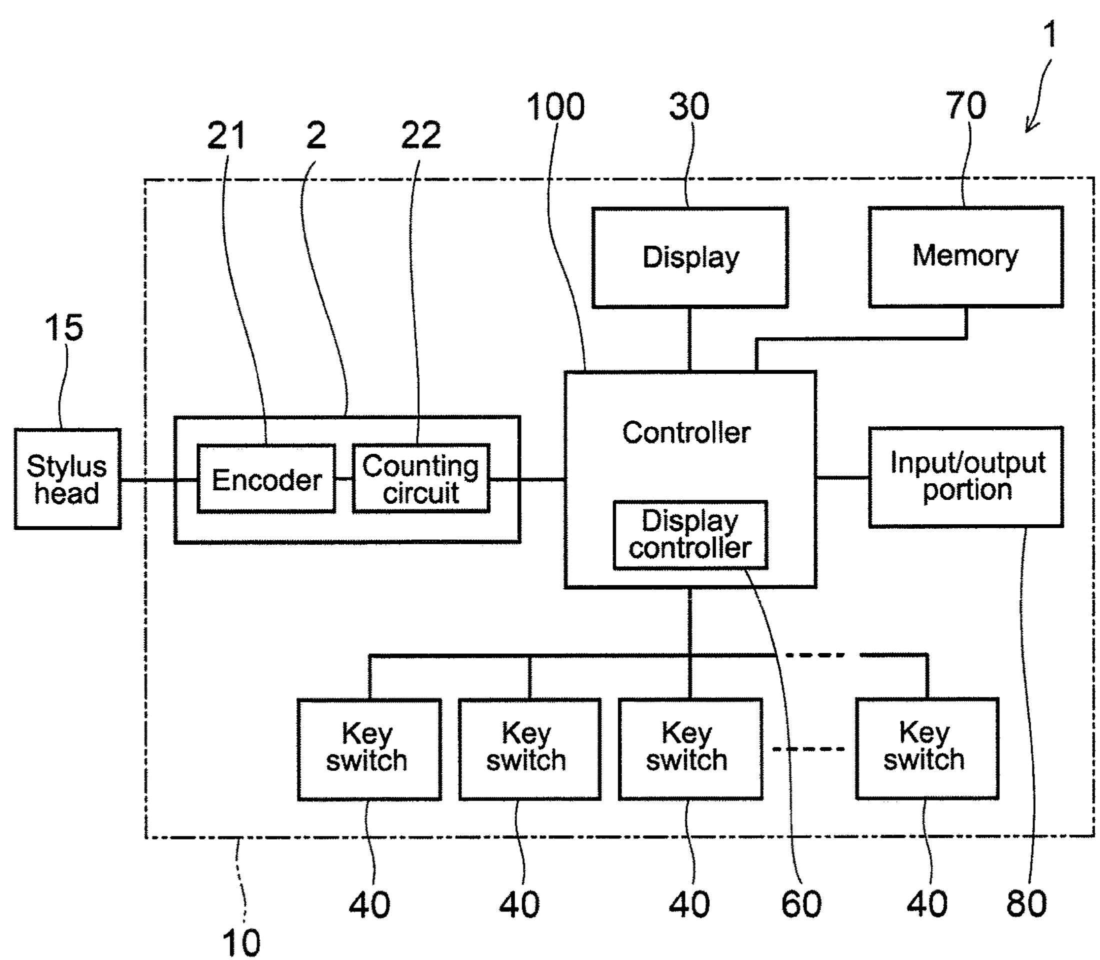
FIG. 3 is a block diagram illustrating a configuration of the measuring instrument.

The following is a description of the block configuration of the measuring instrument 1. FIG. 3 is a block diagram of a configuration of a measuring instrument. The detector 20, the display 30, the plurality of key switches 40, a memory 70, an input/output portion 80, and a controller 100 are provided within the main body casing 10 of the measuring instrument 1.

The detector 20 has an encoder 21 and a counting circuit 22. The amount of stylus head 15 displacement is converted by the encoder 21 into electric signals (position data). The counting circuit 22 obtains the position data output from the encoder 21.

The controller 100 controls various parts such as the detector 20, the display 30, the plurality of key switches 40, the memory 70, and the input/output portion 80, and also performs processes that compute measured values based on a count number signal from the counting circuit 22 of the detector 20.

The memory 70 stores firmware that controls the measuring instrument 1, parameters such as measurement conditions, and measurement results. The input/output portion 80 outputs the measurement results to an external device (for example, a computer) and has an interface that inputs parameters, firmware, and the like from an external device. An interface circuit performing wired or wireless transmissions with an external device is provided as an example of the interface; however, a connector element without an interface circuit would also suffice.

A display controller 60 is included in the controller 100 for the measuring instrument 1 according to the present embodiment. The display controller 60 controls display by the display 30. During the measurement mode, when the detector 20 detects the amount of stylus head 15 displacement, the display controller 60 performs control such that the main display portion 31 of the display 30 displays the measured value based on the amount of displacement. In this way, the measured value computed by the controller 100 is displayed on the segment display portion 311 on the main display unit 31. During this measurement mode, the display controller 60 performs control such that the cursor display portion 32 does not display the cursor. In other words, the cursor is not displayed during the measurement mode. Consequently, the user can observe the measured value that is displayed on the display 30.

Meanwhile, during the settings mode where measurement conditions are set, the display controller 60 performs control such that the cursor is displayed so as to point to the menu notation 50 corresponding to the selected menu. In other words, the display controller 60 causes the cursor to display in a manner pointing to a menu print, from among the menu print 51 to 56 on the menu notation 50, corresponding to a user-selected menu. Thus, the user can easily confirm the selected menu due to the cursor display.

The display controller 60 performs control such that the operation guide display portion 33 corresponding to the key switches 40, which are assigned operations on the user-selected menu, displays the guide displays corresponding to the assigned operations when in the settings mode. Consequently, the user can accurately select operations assigned to the key switches 40 corresponding to the selected menu while referencing the guide displays, and can easily determine settings such as parameters. The display controller 60 performs control such that the operation guide display portion 33 ceases the guide display while in the measurement mode. In other words, the guide displays are not displayed on the operation guide display portion 33 during the measurement mode. Consequently, the user can observe measurement result-related information displayed on the display 30 during the measurement mode.

Figure 4:
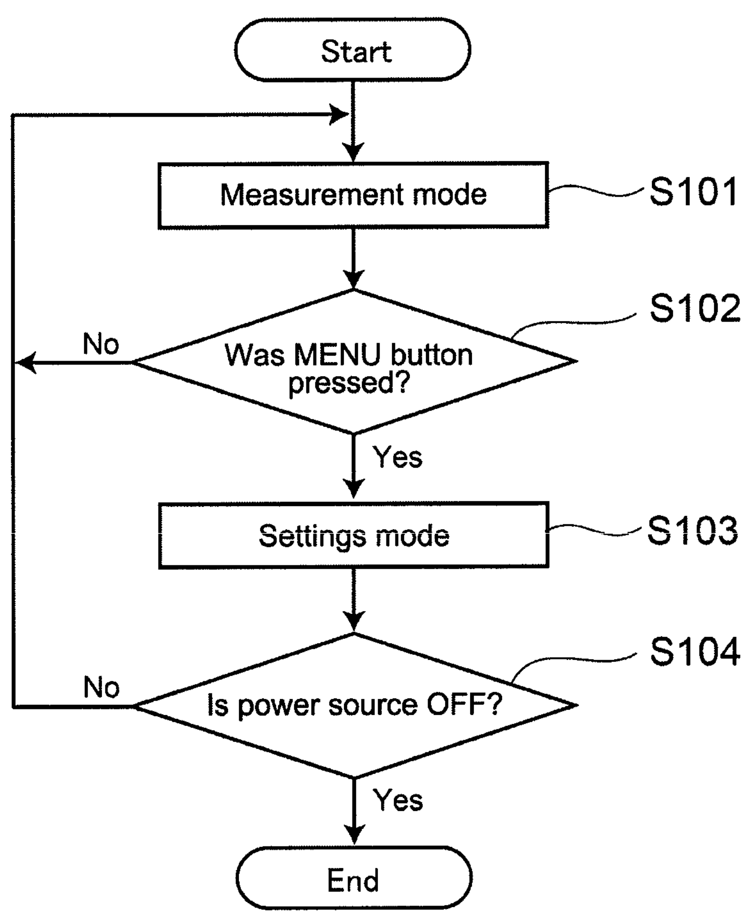
FIG. 4 is a flow chart describing overall operations of the measuring instrument.

The following is a description of operations of the measuring instrument 1 according to the present embodiment. FIG. 4 is a flow chart describing the overall operations of the measuring instrument. The processes illustrated in the flow chart of FIG. 4 are performed by the controller 100. Firstly, the measurement mode is initiated upon supplying a power source of the measuring instrument 1 (Step S 101). In the measurement mode, for example, measuring is initiated using the measurement conditions set at the conclusion of a previous measurement, for example. During the measurement mode, the amount of stylus head 15 displacement from a reference point when touching the stylus head 15 to the object is detected and the measured value is displayed on the display 30.

During the measurement mode, a determination is made as to whether a menu button was pressed (Step S 102). The menu button is assigned to any of the plurality of key switches 40. In the present embodiment, the key switch 42 is the menu button. When the menu button (key switch 42) is not pressed, the measurement mode continues. Pressing the menu button (key switch 42) initiates the settings mode (Step S103).

Once the settings mode has been initiated, parameter settings made by the user are received and stored in the memory 70. Next, a determination is made as to whether the key switch 40 to turn the power OFF has been selected (Step S104). When the power OFF key switch 40 is not selected, the measurement mode is reinitiated. Meanwhile, power to the measuring instrument 1 is turned OFF and operations end when the power off key switch 40 is selected.

Figure 5:
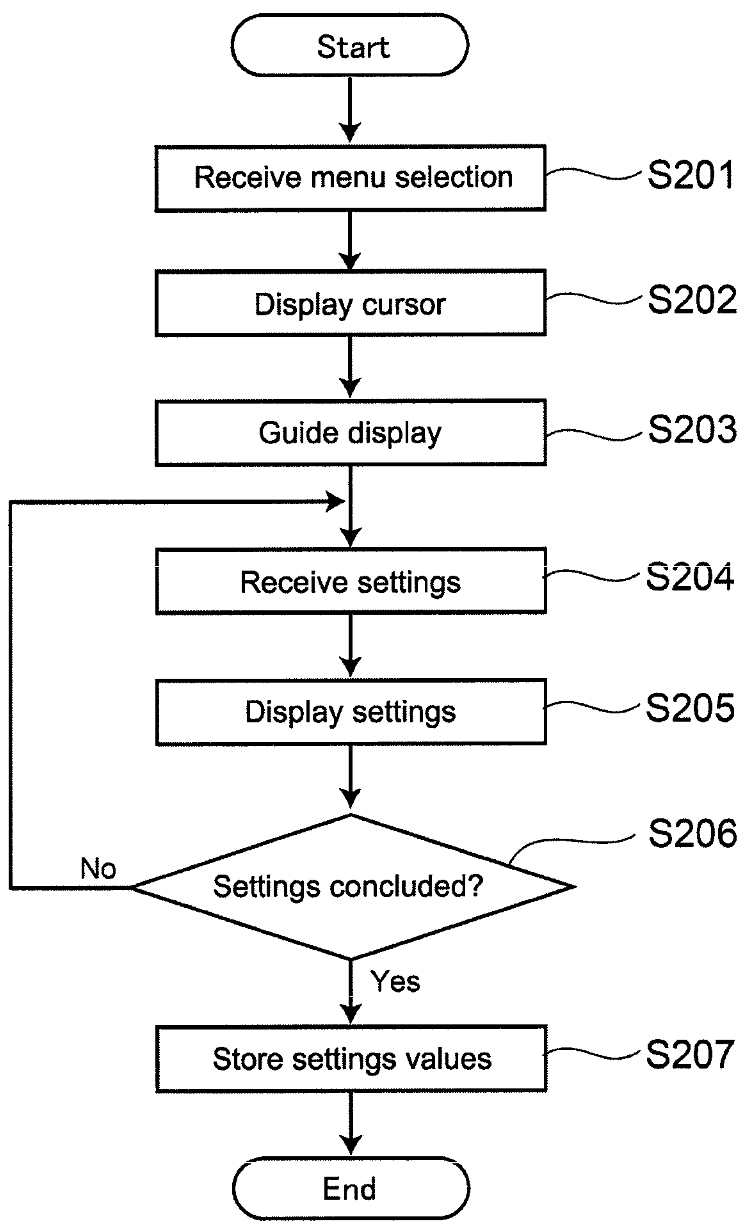
FIG. 5 is a flow chart describing a process flow that takes place in a settings mode.

The following is a description of the settings mode (Step S 103) process flow. FIG. 5 is a flow chart describing the settings mode process flow. First, the controller 100 receives a menu selection (Step S201). In other words, selection of a menu (namely parameters which the user wishes to set) is enabled when the user presses the menu button (key switch 42). When the user presses the select buttons (key switches 43 and 45), the controller 100 receives the command and changes the selected menu. Lastly, when the user presses an OK button (key switch 44), the controller 100 determines which menu was selected.

Next, the display controller 60 receives commands from the controller 100 and displays the cursor of the menu notation 50 so as to point to the menu print (one of the menu print 51 to 56) corresponding to the user-selected menu (Step S202). The user is able to determine which menu was selected due to the display of the cursor.

Next, the display controller 60 displays the guide displays on the operation guide display portion 33 (Step S203). In other words, on the user-selected menu, the guide displays corresponding to assigned operations are displayed on the operation guide display portion 33 for the key switches 40 that are assigned operations. Guide displays are not displayed on the operation guide display portion 33 for key switches 40 that have not been assigned operations. The user can determine which of the key switches 40 is valid for the currently selected menu and what functions are assigned to the valid key switches 40 by referencing the guide displays.

Next, the controller 100 receives the user parameter settings (Step S204). In accordance with the guide displays, the user makes a predetermined parameter setting using the necessary key switches 40 for parameter settings. Parameters being set are displayed on the main display portion 31 (Step S205).

Next, the controller 100 determines whether the user parameter settings have concluded (Step S206). The controller 100, for example, receives information when the user selects the key switch 40 that has been assigned a function of completing settings. Should the settings not be completed, Step S204 is reinitiated and the controller 100 continues to receive settings. When the settings are completed, the controller 100 stores the user-defined parameters in the memory 70 (Step S207), and ends the settings mode.

Although not illustrated in the flow chart of FIG. 5, parameters being set are not stored in the memory 70 and the measurement mode is reinitiated when the key switch 40 equivalent to a cancel function is selected in the settings mode.

Figure 6A:
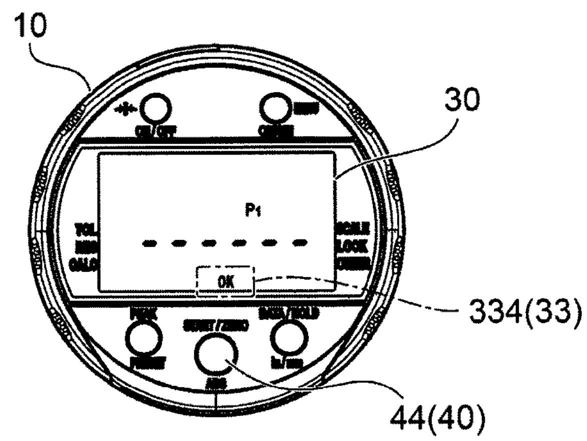
FIGS. 6A to 6C are diagrams of screen transitions that take place after installing a battery.
Figure 6B:
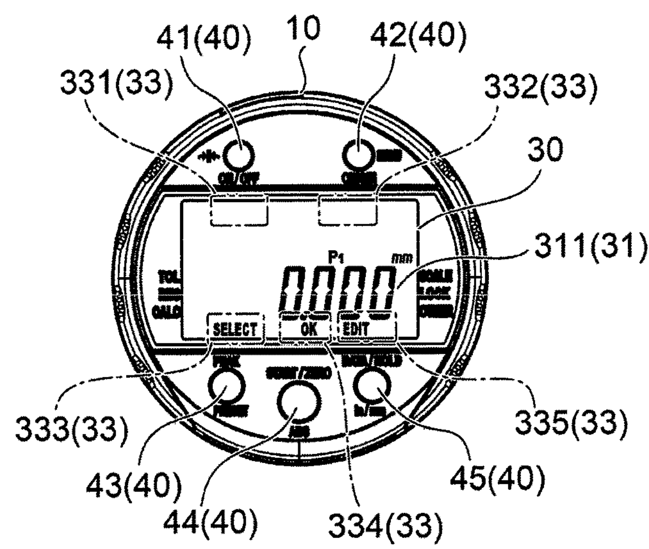
Figure 6C:
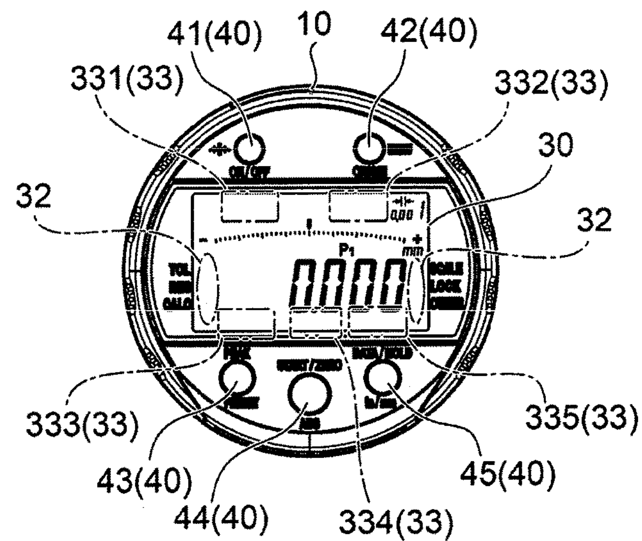

The following is a description of exemplary display 30 screen transitions for the measuring instrument 1 according to the present embodiment. FIGS. 6A to 6C illustrate the screen transitions that take place after installing the battery. First, as illustrated in FIG. 6A a bar is displayed immediately after installing the battery. The guide display 334 also displays “OK” on the operation guide display portion 33 in proximity to the key switch 44. Due to the guide display 334, it is understood that the key switch 44 possesses the “OK” function.

When the user presses the key switch 44 displaying “OK,” preset values are displayed on the segment display portion 311 of the main display portion 31 as illustrated in FIG. 6B. The preset values are measurement reference point values and are set beforehand. For the measuring instrument 1 according to the present embodiment, a plurality of presets (for example P1 to P3) may be made. While on the preset value display screen, the guide display 333 of the operation guide display portion 33 displays “SELECT,” the guide display 334 displays “OK,” and the guide display 335 displays “EDIT.” Nothing is displayed on the guide display 331 and the guide display 332. In other words, it is understood that the key switch 43 corresponding to the guide display 333 has a “SELECT” function, the key switch 44 corresponding to the guide display 334 has an “OK” function, and that the key switch 45 corresponding to the guide display 335 has an “EDIT” function. Additionally, it is understood that the key switch 41 and the key switch 42 are not assigned functions since guide displays are not displayed.

In this way, each time the user presses the key switch 43 the next preset value displays. When the user presses the key switch 45, an edit preset value mode initiates. As illustrated in FIG. 6C, when the user presses the key switch 44 displaying “OK,” the measurement mode screen displays. In measurement mode, the segment display portion 311 displays the measured values, while nothing is displayed in the cursor display portion 32 and the operation guide portion 33.

Figure 7A:
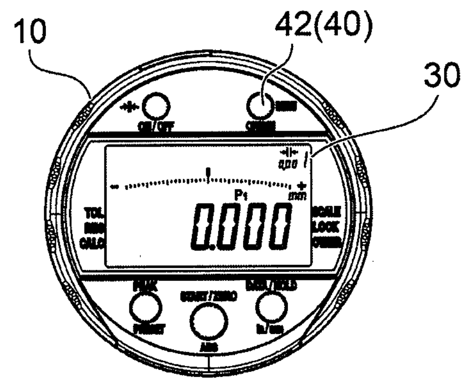
FIGS. 7A to 7D are diagrams of the screen transitions that occur when making menu settings.
Figure 7B:
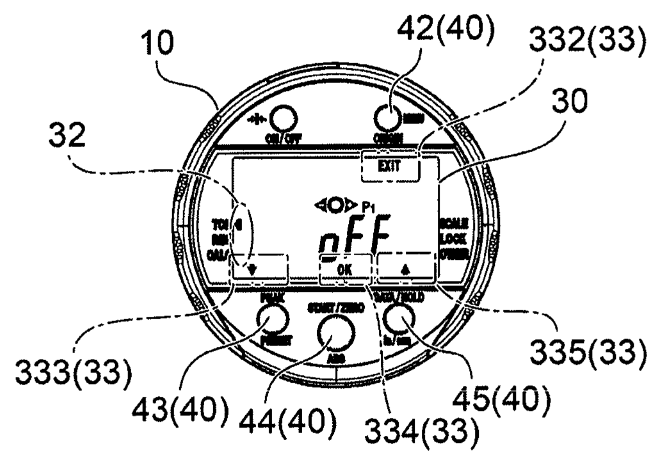

The following is a description of an example of the screen transitions that take place when making menu settings. FIGS. 7 to 9 illustrate the screen transitions that take place when making menu settings. An example of parameter settings for computational functions is illustrated. FIG. 7A illustrates a measurement mode screen that is displayed after supplying the power source. When the key switch 42 corresponding to a "MENU" function is pressed during the measurement mode, a transition from the measurement mode to the settings mode occurs. As illustrated in FIG. 7B, when transitioning into the settings mode, the cursor of the cursor display portion 32 points to the "TOL" menu print 51.

When transitioning into the settings mode, guide displays are displayed corresponding to the key switches 40 that have been assigned functions on the operation guide display portion 33. As illustrated in the example in FIG. 7B, "EXIT" is displayed by the guide display 332 corresponding to the key switch 42. "EXIT" is the function that exits the settings mode and returns to the measurement mode.

The guide display 333 corresponding to the key switch 43 displays "↓." The "↓" is a function to select one menu below the present menu. The guide display 335 corresponding to the key switch 45 displays "↑." The "↑" is a function to select one menu above the present menu. The guide display 334 corresponding to the key switch 44 displays "OK." Meanwhile, nothing is displayed by the guide display 331 corresponding to the key switch 41. In this state, no functions are assigned to the key switch 41. Consequently, no changes occur when the key switch 41 is pressed.

Figure 7C:
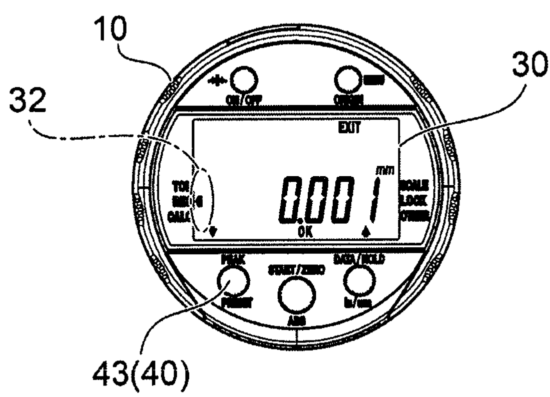

As illustrated in FIG. 7C, when the key switch 43 corresponding to the guide display 333 which displays "↓," is pressed once, the cursor of the cursor display portion 32 moves down once and points to the "RES" menu print 52. Additionally, when the key switch 45 corresponding to the guide display 335 which displays "↑" is pressed once, the cursor of the cursor display portion 32 moves up once.

Figure 7D:
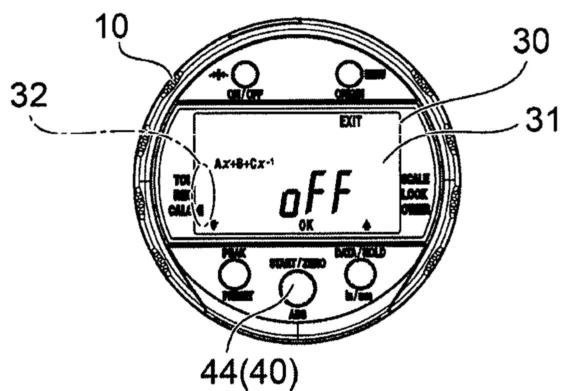

When pressing the key switch 43 once when in a state illustrated in FIG. 7C, the cursor of the cursor display portion 32 moves down once and points to the "CALC" menu print 53 as illustrated in FIG. 7D. In this way, the user can determine that the menu where the "CALC" computational function parameters are set is being selected.

When the cursor points to each menu location, the current settings status for the displayed menu is displayed on the main display portion 31. In the example illustrated in FIG. 7D, the letters "OFF" are displayed by the main display portion 31. This indicates that computational functions are presently "OFF."

Figure 8A:
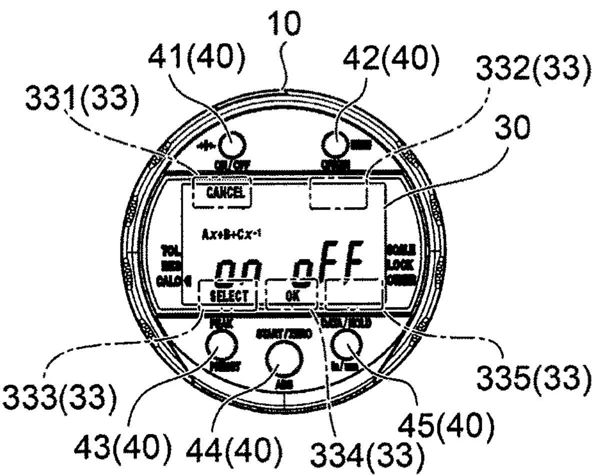
FIGS. 8A to 8D are diagrams of the screen transitions that occur when making menu settings.

When the key switch 44 corresponding to the guide display 334 "OK" is pressed during this state, as illustrated in FIG. 8A, a transition to a computational function parameter settings screen occurs. Moreover, the guide display of the operation guide display portion 33 changes to correspond to this mode.

In the example illustrated by FIG. 8A, the guide display 331 corresponding to the key switch 41 displays "CANCEL." The "CANCEL" function exits the present menu, returning to one level higher. As illustrated in FIG. 7D, when the key switch 41 corresponding to "CANCEL" is pressed, a transition to a screen that is one level higher occurs.

The guide display 333 corresponding to the key switch 43 displays "SELECT." Previously, at one level higher (refer to FIG. 7D) the guide display 333 corresponding to the key switch 43 displayed "↓," but at this level, the same guide display 333 corresponding to the key switch 43 displays "SELECT." In other words, the guide display 333 corresponding to the key switch 43 changes in accordance with the menu level. Furthermore, the guide display 334 corresponding to the key switch 44 displays "OK." Nothing is displayed on the guide display 332 and the guide display 335 corresponding to the key switch 42 and the key switch 45, respectively.

Figure 8B:
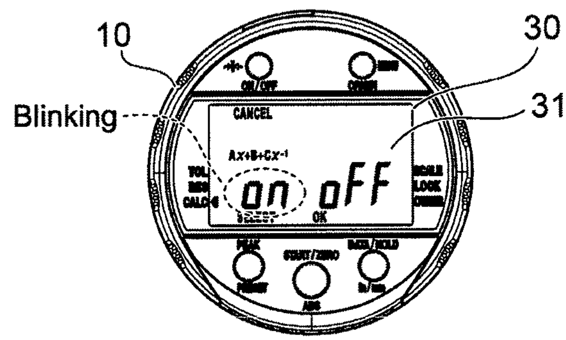

Computational functions are turned ON/OFF when the user presses the key switch 43 corresponding to the guide display 333 which displays "SELECT." As illustrated in FIG. 8B, the selection of either ON or OFF is, for example, displayed blinking on the main display portion 31.

Figure 8C:
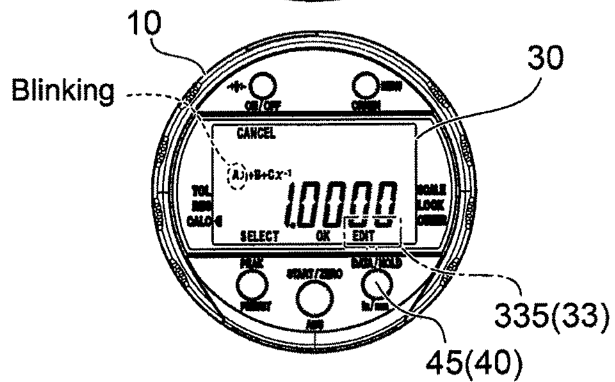

As illustrated in FIG. 8C, a screen transition to a screen where various computational function parameters are set occurs when the user presses the key switch 44 corresponding to the guide display 334 which displays "OK." In the example illustrated by FIG. 8C, a parameter "A" in the computational expression "$Ax+B+Cx^{-1}$" is displayed blinking, for example, thus indicating that "A" is in a settings mode.

Figure 8D:
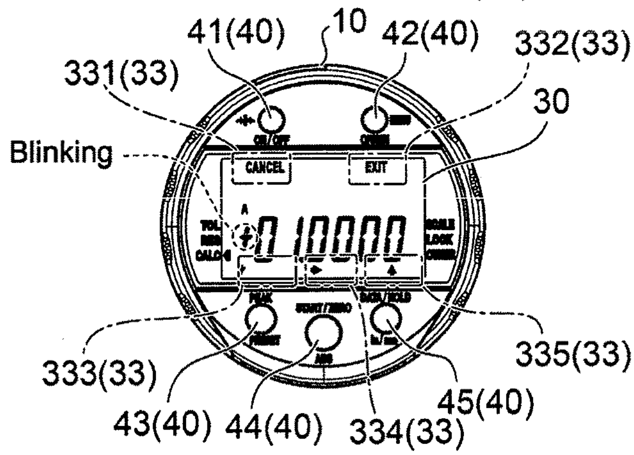

While in this mode, the guide display 335 corresponding to the key switch 45 displays "EDIT," the function in which parameters are edited. As illustrated in FIG. 8D, when the user presses the key switch 45 corresponding to the guide display 335 which displays "EDIT," a transition to a screen to edit the parameter "A" occurs. The operation guide display portion 33 changes the guide displays in accordance to the mode, upon transferring to this mode.

As illustrated in the example of FIG. 8D, the guide display 331 corresponding to the key switch 41 displays "CANCEL," the guide display 332 corresponding to the key switch 42 displays "EXIT," the guide display 333 corresponding to the key switch 43 displays "↓," the guide display 334 corresponding to the key switch 44 displays "Δ," and the guide display 335 corresponding to the key switch 45 displays "↑."

Figure 9A:
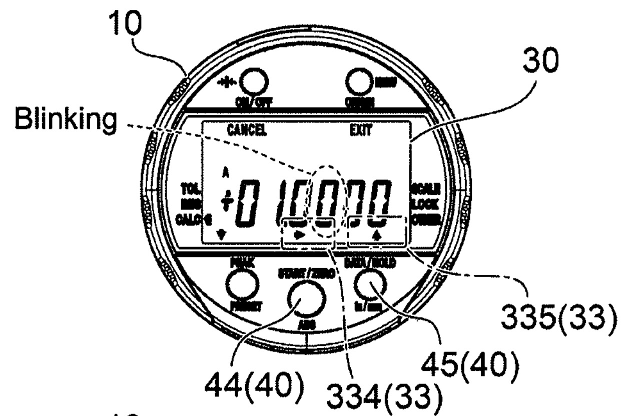
FIGS. 9A to 9D are diagrams of the screen transitions that occur when making menu settings.
Figure 9B:
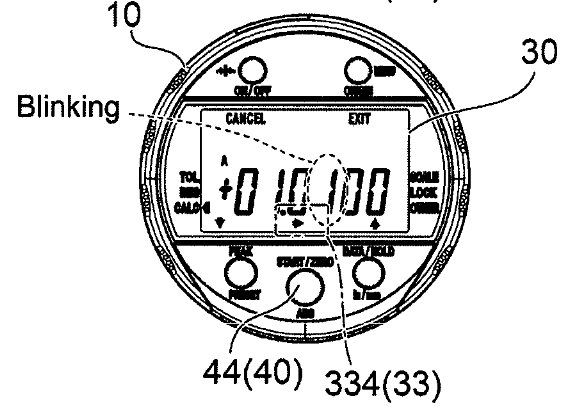

Parameter edit locations (symbols, digits) may be changed, for example, by pressing the key switch 44 corresponding to "Δ." In this case, edit locations are displayed blinking. FIG. 9A illustrates a state in which the digit to be edited is selected by pressing the key switch 44 a designated number of times. In this state, a numerical value of the selected digit is displayed blinking. As illustrated in FIG. 9B, the selected value of the selected digit increases by one by pressing the key switch 45 which corresponds to "↑."

Figure 9C:
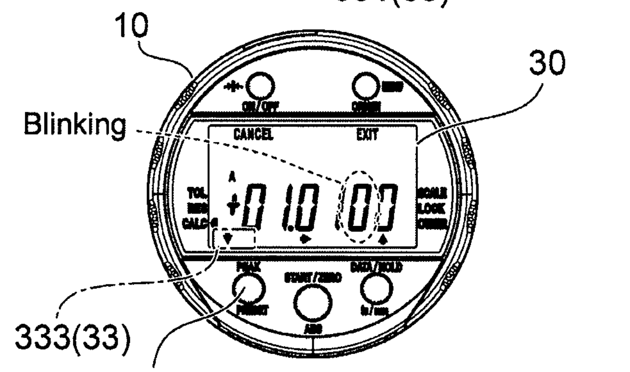
Figure 9D:
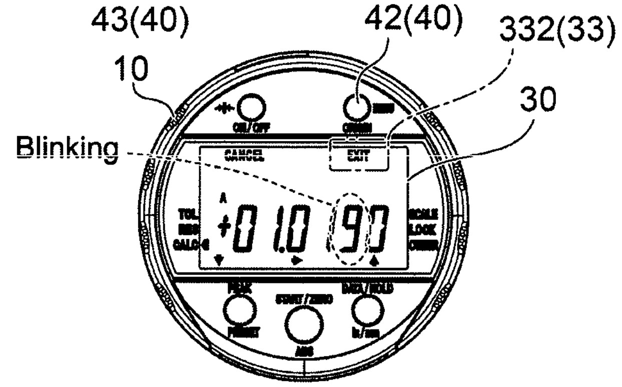

As illustrated in FIG. 9C, one digit adjacent to the presently selected digit is selected when the key switch 44 which corresponds to "Δ" is pressed. As illustrated in FIG. 9D, the value of the selected digit decreases by one when pressing the key switch 43 which corresponds to "↓." Desired values are set by repeating this operation.

Once the values are set, the key switch 42 which corresponds to "EXIT" is pressed. In this way, set values are stored in the memory 70 and the screen transitions to the measurement mode screen as illustrated in FIG. 7A.

The cursor displays in the cursor display portion 32 when in the settings mode, where settings for the parameters of each menu are made, and thus the selected menu is easily determined for the measuring instrument 1 according to the present embodiment. Additionally, the guide displays 331 to 335 are displayed in the operation guide display portion 33 corresponding to the key switches 40 assigned functions in accordance with the selected menu. Consequently, the user can make parameter settings accurately and easily by referencing the guide displays 331 to 335.

As described above, due to the present embodiment, visibility and operability can be improved and a measuring instrument 1 with a superior user interface can be provided even when a display 30 is provided on a main body casing 10 of limited size.

A description of the present embodiment was provided above; however, the present invention is in no way limited to the present embodiment. In the above embodiment, for example, an example is described in which the display 30, key switches 40, and menu notation 50 are provided on the front surface 10*a*. Of these elements, at least one may be provided on an outer surface other than the front surface 10*a*. With respect to the above embodiment, an individual skilled in the art may add, remove, or change the design of elements. However, as long as such modifications appertain to the scope of the present invention, these modifications are within the purview of the present invention.

As noted above, the present invention can be used not only with an indicator, but also with a height gauge, digital vernier calipers, a linear scale, and the like.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A measuring instrument comprising:

a main body casing;

a detector provided on the main body casing and configured to detect an amount of stylus head displacement;

a display provided on an outer surface of the main body casing;

a plurality of key switches provided on the outer surface of the main body casing;

a menu comprising a plurality of menu indicia provided on the outer surface of the main body casing and proximate the display; and a display controller configured to control the display, wherein the display comprises:

a main display region; and a cursor display region arranged in a position alongside the plurality of menu indicia and configured to display a cursor pointing to the plurality of menu indicia, wherein the display controller is configured to:

control the display such that a measured value based on the amount of displacement is displayed on the main display region, and such that the cursor is not displayed on the cursor display region when in a measurement mode where the detector detects the amount of displacement; and display the cursor so as to point to a selected menu indicium of the plurality of menu indicia when in a settings mode where measurement conditions are set.

2. The measuring instrument according to claim 1, wherein:

the display further comprises an operation guide display region proximate each of the plurality of key switches, and the display controller is further configured to control the display such that, in the settings mode, a guide display corresponding to at least one assigned operation of the plurality of key switches for the selected menu indicium is displayed on the operation guide display region.

3. The measuring instrument according to claim 2, wherein the display controller is further configured to control the display such that the guide displays are not displayed on the operation guide display region corresponding to key switches not assigned operations for the selected menu indicium.

4. The measuring instrument according to claim 3, wherein the display controller is further configured to control the display such that, in the measurement mode, the guide displays are not displayed on the operation guide display region.

5. The measuring instrument according to claim 4, further comprising:

a first indicium, indicating operations in which a press time of the key switches is shorter than a preset amount of time, located proximate to at least one of the plurality of key switches on the outer surface; and a second indicium, indicating operations in which the press time of the key switches is equal to or longer than the preset amount of time, located proximate to the least one of the plurality of key switches on the outer surface.

6. The measuring instrument according to claim 5, wherein:

the plurality of key switches are arranged on at least one of an upper and lower side of the display, and the plurality of menu indicia is arranged on at least one of a left and right side of the display.

7. The measuring instrument according to claim 4, wherein:

the plurality of key switches are arranged on at least one of an upper and lower side of the display, and the plurality of menu indicia is arranged on at least one of a left and right side of the display.

8. The measuring instrument according to claim 3, further comprising:

a first indicium, indicating operations in which a press time of the key switches is shorter than a preset amount of time, located proximate to at least one of the plurality of key switches on the outer surface; and a second indicium, indicating operations in which the press time of the key switches is equal to or longer than the preset amount of time, located proximate to the least one of the plurality of key switches on the outer surface.

9. The measuring instrument according to claim 8, wherein:

the plurality of key switches are arranged on at least one of an upper and lower side of the display, and the plurality of menu indicia is arranged on at least one of a left and right side of the display.

10. The measuring instrument according to claim 3, wherein:

the plurality of key switches are arranged on at least one of an upper and lower side of the display, and the plurality of menu indicia is arranged on at least one of a left and right side of the display.

11. The measuring instrument according to claim 2, wherein the display controller is further configured to control the display such that, in the measurement mode, the guide displays are not displayed on the operation guide display region.

12. The measuring instrument according to claim 11, further comprising:

a first indicium, indicating operations in which a press time of the key switches is shorter than a preset amount of time, located proximate to at least one of the plurality of key switches on the outer surface; and a second indicium, indicating operations in which the press time of the key switches is equal to or longer than the preset amount of time, located proximate to the least one of the plurality of key switches on the outer surface.

13. The measuring instrument according to claim 12, wherein:

the plurality of key switches are arranged on at least one of an upper and lower side of the display, and the plurality of menu indicia is arranged on at least one of a left and right side of the display.

14. The measuring instrument according to claim 11, wherein:

the plurality of key switches are arranged on at least one of an upper and lower side of the display, and the plurality of menu indicia is arranged on at least one of a left and right side of the display.

15. The measuring instrument according to claim 2, further comprising:

a first indicium, indicating operations in which a press time of the key switches is shorter than a preset amount of time, located proximate to at least one of the plurality of key switches on the outer surface; and a second indicium, indicating operations in which the press time of the key switches is equal to or longer than the preset amount of time, located proximate to the least one of the plurality of key switches on the outer surface.

16. The measuring instrument according to claim 15, wherein:

the plurality of key switches are arranged on at least one of an upper and lower side of the display, and the plurality of menu indicia is arranged on at least one of a left and right side of the display.

17. The measuring instrument according to claim 2, wherein:

the plurality of key switches are arranged on at least one of an upper and lower side of the display, and the plurality of menu indicia is arranged on at least one of a left and right side of the display.

18. The measuring instrument according to claim 1, further comprising:

a first indicium, indicating operations in which a press time of the key switches is shorter than a preset amount of time, located proximate to at least one of the plurality of key switches on the outer surface; and a second indicium, indicating operations in which the press time of the key switches is equal to or longer than the preset amount of time, located proximate to the least one of the plurality of key switches on the outer surface.

19. The measuring instrument according to claim 18, wherein:

the plurality of key switches are arranged on at least one of an upper and lower side of the display, and the plurality of menu indicia is arranged on at least one of a left and right side of the display.

20. The measuring instrument according to claim 1, wherein:

the plurality of key switches are arranged on at least one of an upper and lower side of the display, and the plurality of menu indicia is arranged on at least one of a left and right side of the display.

* * * * *